(12) United States Patent
Ikemiya et al.

(10) Patent No.: US 6,419,766 B1
(45) Date of Patent: Jul. 16, 2002

(54) CUTTING-FREE BRONZE ALLOYS

(75) Inventors: Yukinori Ikemiya; Hideki Yoshimura; Kenji Sugiyama, all of Osaka; Kunio Nakashima, Toyama-ken; Masao Hosoda, Toyama-ken; Wataru Yago, Toyama-ken; Kazuyuki Inagaki, Toyama-ken, all of (JP)

(73) Assignees: Tabuchi Corp., Osaka; Chuetsu Metal Works Co., Ltd., Toyama-ken, both of (JP)

( * ) Notice: Subject to any disclaimer, the term of this patent is extended or adjusted under 35 U.S.C. 154(b) by 0 days.

(21) Appl. No.: 09/724,184

(22) Filed: Nov. 28, 2000

Related U.S. Application Data

(63) Continuation-in-part of application No. 08/626,511, filed on Apr. 2, 1996, now abandoned.

(51) Int. Cl.$^7$ .............................. C22C 9/02; C22C 9/04
(52) U.S. Cl. ..................................... 148/433; 420/472
(58) Field of Search ........................... 148/433; 420/472

(56) References Cited

U.S. PATENT DOCUMENTS

| | | | |
|---|---|---|---|
| 5,167,726 A | 12/1992 | IoIacono et al. | 148/432 |
| 5,286,444 A | 2/1994 | Tomikawa et al. | 420/491 |
| 5,330,712 A | * 7/1994 | Singh | 420/473 |
| 5,487,867 A | 1/1996 | Singh | 420/421 |

FOREIGN PATENT DOCUMENTS

| | | |
|---|---|---|
| JP | 57-076142 | 5/1982 |
| JP | 63-266049 | 11/1988 |

* cited by examiner

*Primary Examiner*—Sikyin Ip
(74) *Attorney, Agent, or Firm*—Flynn, Thiel, Boutell & Tanis, P.C.

(57) ABSTRACT

A cutting-free bronze alloy which is substantially free of lead contains 1 to 13 wt. % of tin, not larger than 18 wt. % of zinc, 0.5 to 6 wt. % of bismuth, 0.05 to 3 wt. % of antimony, not larger than 1 wt. % of phosphorus, less than 0.4 wt. % of lead, and the balance being copper. The alloy may further contain 0.1 to 3 wt. % of nickel. When 3 to 8 wt. % of tin and 6 to 10 wt. % of zinc are present, the alloy is particularly suitable for use as a plumbing faucet and fixture. Likewise, when 8.5 to 13 wt. % of tin and not larger than 1 wt. % of zinc are present, the alloy is suitable for use as a sliding member.

2 Claims, 3 Drawing Sheets

| | | |
|---|---|---|
|  | chips of linear form | ⎫ |
|  | tangled chips | ⎪ |
|  | chips of helical form | ⎬ Bad |
|  | cylindrical winding chips | ⎪ |
|  | densely cylindrical winding chips | ⎭ |
|  | spiral, convergently spiral chips | ⎫ |
|  | broken chips | ⎬ Good |
|  | shear-failed chips | ⎭ |

Test pin (test piece)

U block (counter member)

CUTTING-FREE BRONZE ALLOYS

This application is a continuation-in-part of Ser. No. 08/626,511 filed Apr. 2, 1996 now abandoned.

BACKGROUND OF THE INVENTION

1. Field of The Invention

This invention relates to cutting-free bronze alloys which are substantially free of lead and which exhibit good castability and a good corrosion resistance. The alloys are adapted for use in various fields such as of plumbing faucets and fixtures for water supply for general-purpose pipings, and sliding members employed in a corrosive atmosphere such as of fresh water or sea water. The alloys are also suitable as a material which is employed when it is desirable to improve machinability, soundness in texture, pressure resistance and anti-seizing property while eliminating the injury from lead.

2. Description of the Prior Art

In general, characteristic requirements for constituent materials of plumbing faucets and fixtures for water supply for general-purpose pipings (hereinafter referred to generically as cock fixtures) include (1) good flowability because of the adoption of a casting method which is used to make complicated shapes, (2) good soundness in texture for preventing detrimental porosity which is liable to occur owing to the possible irregularity in thickness, (3) high mechanical strength and a good pressure resistance since no water leakage is permitted on use as a cock fixture, (5) good machinability because of a great number of portions to be worked, and (6) a good resistance to corrosion through dezincification since the fixture is employed in contact with water supply, waters or sea water and should thus have a good corrosion resistance. Moreover, when used as sliding members which are used in contact with fresh water or sea water and should have a good corrosion resistance, such a constituent material should effectively prevent corrosion through dezincification. The constituent material should also have a good anti-seizing property in order to ensure good sliding characteristics. In order to almost satisfy these requirements, usual practice is to use brass or bronze materials.

However, the conventionally employed materials as mentioned above have the following problems which should be overcome. Brass materials utilized for the plumbing faucets and fixtures include, for example, JIS.H.3250.C3604, C3771 (cutting-free brasses), which contain large amounts of lead. Thus, the injury from lead is not avoidable. In fact, when they are in contact with water, corrosion through dezincification inevitably takes place. Another type of brass material such as JIS.H.3250.C4641 is known as preventing corrosion through dezincification. This brass material contains no lead, so that the machinability is not satisfactory. Although cutting-free brass materials which prevent corrosion through dezincification are commercially sold, they contain lead, thereby causing injury from lead. In addition, cutting-free brass materials wherein lead is substituted with bismuth are known. However, no tin is added to the materials, so that the corrosion through dezincification is liable to occur, coupled with another problem that the materials contain a misch metal and is thus expensive (Japanese Laid-open Patent Application No. 5-255778).

Moreover, U.S. Pat. No. 5167726 discloses a cutting-free brass wherein lead is substituted with bismuth, but expensive indium is also contained therein, resulting in high costs. A further type of brass which contains phosphorus in place of indium is known. However, phosphorus reacts with iron in the starting materials, thereby creating hard spots in the resultant brass. This, in turn, requires the use of starting materials which have to be substantially free of any metals adversely influencing the brass alloy, thus inviting a rise in cost. On the other hand, bronze materials which are utilized as a plumbing faucet and fixture include, for example, JIS.H.5111.BC1, BC6 and BC7. These materials have good castability, soundness in texture and machinability along with a satisfactory pressure resistance. However, the bronze materials contain a large amount of lead, thereby presenting the problem of injury from lead. Moreover, other types of bronze materials are known including, for example, JIS.H.5111.BC2, BC3. Although these types of materials contain not larger than 1 wt. % of lead, lead is not positively incorporated as an additive element. More particularly, the content of lead in these materials is less than that of lead-containing bronzes, thus leading to poorer machinability. Japanese Patent Publication No. 5-63536 discloses a material wherein lead in lead bronzes is replaced by bismuth to prevent injury from lead and improve the machinability and castability. However, a multitude of pores are formed at the time of casting, thereby impeding the soundness in texture. In addition, this material is poorer in pressure resistance and mechanical strength than lead-containing bronzes. Hence, limitation is placed on the use of the material as articles which are simple in shape and which are relatively uniform in thickness. Furthermore, the material disclosed in Japanese Patent Publication No. 5-279771 has a similar problem as in Japanese Patent Publication No. 5-63536, coupled with another problem that it contains a misch metal and is thus expensive.

Next, the materials utilized as sliding members include, for example, aluminium bronze materials such as JIS.H.5114.AlBC1, AlBC2 and AlBC3. These materials undergo corrosion through dealuminization and are low in anti-seizing property and poor in machinability. In contrast, brass which is set out, for example, in Japanese Laid-open Patent Application No. 63-16456 is admixed with 0.5 to 2 wt % of tin in order not to cause corrosion through dezincification and further with bismuth in place of lead thereby improving machinability. Moreover, in order to improve a wear resistance, 1.0 to 10.0 wt % of graphite is added. For the uniform dispersion of the graphite, a mold has to be used, which places limitation on the shape of articles along with an additional cost of the mold. On the other hand, phosphorus bronze is known including JIS.H.5113.PBC2. This bronze does not cause any corrosion through dezincification and has a satisfactory wear resistance. Because neither lead nor bismuth is added to the material, it is poor in machinability and is worse in anti-seizing property than similar bronze alloys containing lead. Moreover, a material called CDA915, wherein nickel and lead are added to the phosphorus bronze material, is known and has been in wide use as a material for gears. This material is excellent in wear resistance and corrosion resistance through dezincification but is injured from lead owing to the presence thereof.

The term "injury from lead" used herein is intended to mean injuries of human body or environments caused from lead. More particularly, the problems involved at the time of fabrication of articles during the course of high temperature working operations such as liquation or dissolution, casting and welding include the formation of metallic fumes containing lead. Likewise, the problems caused during the course of working processes such as cutting, polishing and the like include the formation of metallic dust or powder. In the use of the resultant articles, another problem is involved in that lead is liable to dissolve out from portions contacting with water and that worn dust is inevitably produced at sliding portions.

As is apparent from the above, most of the alloys produced in the prior art contain lead, and thus, present injurious problems of lead to the human body and environment. If, however, alloys which are free of any lead in order to prevent injury from lead are used, machinability, anti-seizing property and pressure resistance become poorer than those of lead-containing alloys. This places limitations on the types of articles to be fabricated or utilized. The substitution of lead with bismuth can solve these disadvantages and will make it possible to improve the machinability and anti-seizing property to an extent comparable to those of lead-containing materials. However, such materials have a great number of pores produced at the time of casting and are thus inferior in pressure resistance and mechanical strength to lead-containing materials.

SUMMARY OF THE INVENTION

It is accordingly an object of the invention to provide a bronze alloy which is substantially free of any injury from lead and has good machinability, anti-seizing property and pressure resistance.

It is another object of the invention to provide a bronze alloy which is satisfactory with respect to castability, soundness in texture, resistance to corrosion through dezincification, wear resistance and the like.

In a broad aspect, the above objects can be achieved, according to a first embodiment of the invention, by a cutting-free bronze alloy which comprises 1 to 13 wt % of tin, not greater than 18 wt % of zinc, 0.5 to 6 wt % of bismuth, 0.05 to 3 wt % of antimony, not greater than 1 wt % of phosphorus, less than 0.4 wt % of lead, and the balance being copper.

Since the alloy defined above comprises less than 0.4 wt % of lead, the injury from lead can be prevented at the time of fabrication or use of articles of the alloy. A small amount of bismuth added to the alloy can improve machinability and anti-seizing property while ensuring the soundness in texture. Antimony serves to suppress formation of pores at the time of fabrication and ensures the soundness along with the pressure resistance and mechanical strength being improved. Tin is effective in preventing corrosion through dezincification. The castability of the alloy is improved by addition of zinc and phosphorus, and the wear resistance and mechanical strength can be improved by means of zinc and phosphorus along with tin. In this manner, the alloy of the invention is prevented from the injury from lead and exhibits good machinability, anti-seizing property and pressure resistance along with other satisfactory characteristics such as castability, soundness, a resistance to corrosion through dezincification, and a wear resistance. Thus, the alloy is particularly suitable for use as plumbing faucets and fixtures and sliding members.

Preferably, the alloy further comprises from 0.1 to 3 wt % of nickel. When nickel is added in such an amount as defined above, the alloy is reinforced as a matrix and is appropriately prevented from segregation.

According to a second embodiment of the invention, there is preferably provided a cutting-free bronze alloy which comprises 3 to 8 wt % of tin, 6 to 10 wt % of zinc, 0.5 to 6 wt % of bismuth, 0.5 to 2 wt % of antimony, 0.001 to 0.5 wt % of phosphorus, less than 0.2 wt % of lead and the balance being copper.

In the above-defined alloy, tin is present in an amount of 3 to 8 wt %, so that the alloy has both good mechanical strength and a good resistance to corrosion through dezincification. Since the contents of zinc and phosphorus are, respectively, in the ranges of 2 to 10 wt % and 0.001 to 0.5 wt %, better castability is ensured. This is very suitable for fabricating castings having a complicated shape such as bib cocks. Moreover, antimony is present in an amount of 0.1 to 2 wt %, so that the resultant alloy is more improved in toughness and mechanical strength and is enhanced in soundness while suppressing the porosity. In this case, it is more preferred to add nickel in amounts of 0.1 to 3 wt % as in the first embodiment for the same reasons as set out hereinabove.

According to a third preferred embodiment of the invention, there is provided a cutting-free bronze alloy which comprises 8.5 to 13 wt % of tin, not greater than 1 wt % of zinc, 0.5 to 6 wt % of bismuth, 0.05 to 3 wt % of antimony, 0.05 to 1 wt % of phosphorus, less than 0.4 wt % of lead and the balance being copper.

Since 8.5 to 13 wt % of tin, not greater than 1 wt % of zinc and 0.05 to 1 wt % of phosphorus are present, the resultant alloy is more improved in wear resistance and is optimum for use as a sliding member, e.g. a worm wheel, which is employed under severe conditions. The alloy should more preferably comprise nickel in amounts of 0.1 to 3 wt % for similar reasons as having set out hereinabove.

DETAILED DESCRIPTION OF THE INVENTION

Figure 1:
FIG. 1 is an illustrative view showing cut chips to illustrate evaluation standards for machinability.
Figure 1:
Figure 1:
Figure 1:
Figure 1:
Figure 1:
Figure 1:
Figure 1:
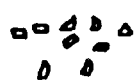

The constituent components of the alloy of the present invention are described.

Tin is added so as to reinforce the matrix of the alloy, improve the wear resistance and suppress corrosion through dezincification. The reason why tin is present in amounts of 1 to 13 wt % is that when the content of tin is less than 1 wt %, the reinforcement, improvement and suppression as mentioned above cannot be expected satisfactorily. On the other hand, when the amount exceeds 13 wt %, a number of δ phase portions which are hard and brittle appear in the texture, thereby impeding mechanical strength. Preferably, on one hand, the content ranges from 3 to 8 wt %, within which the resultant alloy is adapted for use as a bib cock as having both a good resistance to corrosion through dezincification and good strength. On the other hand, when the content of tin preferably ranges from 8.5 to 13 wt % as defined hereinbefore, the wear resistance is more improved and the resultant alloy is more suitable for use as a sliding member which requires a higher wear resistance.

Zinc serves as a deoxidizer at the time of melting to enhance castability, and is solid solubilized in the matrix of the alloy thereby increasing the strength. The content of zinc should be not larger than 18 wt %. This is because when the content exceeds 18 wt %, the corrosion through dezincification is liable to occur. Preferably, the content of zinc ranges from 6 to 10 wt %, within which better castability is expected. Thus, such an alloy is suitably used as castings having a complicated shape, e.g. cock fixtures. When the content of zinc is not larger than 1 wt % while defining the contents of other constituent elements include tin, bismuth, antimony, phosphorus, lead and copper as defined hereinbefore, respectively, the anti-seizing property is remarkably improved. Thus, such an alloy is optimum for use as a sliding member, e.g. a worm wheel, which is employed under severe conditions.

Bismuth contributes to improving machinability and anti-seizing property. The amount of bismuth ranges from 0.5 to 6 wt % in all the embodiments. If the content is less than 0.5 wt %, the machinability and anti-seizing property are not improved as desired. On the other hand, the amount exceeding 6 wt % is disadvantageous in that the amount of bismuth crystals increases, resulting in the lowering of mechanical strength.

Antimony is effective in reducing the porosity rate at the time of casting of Cu—Sn—Zn—Bi alloys. This element is used in amounts ranging 0.05 to 3 wt % of the alloy. If the amount is less than 0.05 wt %, the reducing effect is not attained satisfactorily. On the other hand, when the amount exceeds 3 wt %, a hard intermetallic compound of Cu—Sn—Sb increases in amount, thereby impeding the toughness of the alloy. In the third embodiment where tin ranges from 3 to 8 wt %, Sb is used in amounts of 0.1 to 2 wt % whereby a better reducing effect can be attained.

Phosphorus serves as a deoxidizer at the time of melting and casting. Thus, the castability and soundness can be enhanced. Moreover, phosphorus reacts with Cu to provide an intermetallic compound of Cu3P thereby improving the wear resistance. Phosphorus is generally present in amounts of not larger than 1 wt %. If the amount exceeds 1 wt %, the intermetallic compound increases in amount, thereby impeding toughness. With the third preferred embodiment wherein the alloy contains 3 to 8 wt % of tin, phosphorus should be present in amounts of 0.05 to 1 wt %. By this, the resultant alloy is more improved in wear resistance and can be appropriately adapted for use as a sliding member. Moreover, with the second preferred embodiment wherein the alloy contains 8.5 to 13 wt %, phosphorus should be present in amounts of 0.001 to 0.5 wt %. The resultant alloy has better wear resistance and castability and is thus suitable as a material for plumbing faucets and fixtures.

In general, lead can improve the machinability, anti-seizing property and pressure resistance of bronze alloys, but brings about an injury therefrom. The content of lead is defined as being less than 0.4 wt. % in the practice of the invention. This is because if the content is less than 0.4 wt. %, the injury from lead is not substantially involved. It should be noted that in the practice of the invention, the content of lead may be positively reduced to zero, but starting materials which are commercially available for the preparation of the alloy of the invention inevitably contain lead. This is the reason why the content of lead is defined as being less than 0.4 wt. %.

Nickel is preferably added to the alloys of the first to third embodiments of the invention in order to reinforce the alloy matrix and prevent segregation in the alloy. The amount of nickel ranges from 0.1 to 3 wt. %. This is because when the amount is less than 0.1 wt. %, the effect of the addition of nickel will not be expected. On the contrary, when the amount exceeds 3 wt. %, the effect will be saturated.

The present invention is described by way of examples. The compositions of the cutting-free bronze alloys according to the examples of the invention are tabulated in Table 1. The alloy compositions for comparison are indicated in Table 2. In the tables, the term "Bal." means "balance". It will be noted that the compositions for comparison include alloys having been set out in "Prior Art". Individual alloys were converted into ingots in a high frequency induction furnace and subjected to casting in a mold to obtain JIS.H.5113.E test pieces.

TABLE 1

| No. | Cu | Sn | Zn | Bi | Sb | P | Pb | Ni | |
|---|---|---|---|---|---|---|---|---|---|
| Claims | Bal. | 3~8 | 6~10 | 05~6 | 0.05~2 | 0.001~0.5 | <0.2 | 0 | Ni = 0 |
|  |  |  |  |  |  |  |  | 0.1~3 | Ni = 0.1~3 Claim 2 |
| A | Bal. | 4.5 | 7.2 | 3.1 | 0.6 | 0.08 | — | 0.1 |  |
| B | ↑ | 5.3 | 6.9 | 2.7 | 0.1 | 0.1 | 0.05 | — | Added this time |
| C | ↑ | 3.1 | 7.8 | 0.8 | 0.06 | 0.03 | 0.10 | 1.5 | ↑ |
| D | ↑ | 6.7 | 8.3 | 1.8 | 0.8 | 0.01 | 0.17 | — | ↑ |
| E | ↑ | 3.2 | 9.8 | 4.2 | 0.2 | 0.3 | 0.01 | 0.8 | ↑ |
| F | ↑ | 5.6 | 6.1 | 5.8 | 1.7 | 0.45 | — | 2.8 | ↑ |

TABLE 2

| No. | Cu | Sn | Zn | Bi | Mn | Al | P | Pb | Ni | Fe | Remarks |
|---|---|---|---|---|---|---|---|---|---|---|---|
| 8 | Bal. | 7.5 | 4.5 | — | — | — | 0.07 | 0.1 | 0.2 | — | JIS H5111 BC2 |
| 9 | do. | 4.5 | 5.5 | — | — | — | 0.06 | 5.0 | — | — | JIS H5111 BC6 |
| 10 | do. | 9.5 | 0.1 | — | — | — | 0.17 | 0.1 | 0.3 | — | JIS H5113 PBC2 JIS H3250 C3604 |
| 11 | do. | 0.02 | 37.0 | — | — | — | — | 2.5 | — | 0.03 | JIS H3250 C4641 Jap. Pat. Pub. |
| 12 | do. | 0.8 | 38.0 | — | — | — | — | 0.3 | — | 0.01 | No. 5-63536 CDA 915 |
| 13 | do. | 4.0 | 10.0 | 3.0 | — | — | — | — | — | — | JIS H5114 AlBC3 |
| 14 | do. | 10 | — | — | — | — | 0.1 | 2.5 | 3.5 | — |  |
| 15 | do. | — | 0.1 | — | 0.8 | 9.5 | — | — | 4.7 | 4.2 |  |
| 16 | do. | 0.9 | 33 | — | — | — | — | 1.9 | 0.5 | 0.3 |  |

These test pieces were each subjected to a tensile test, a corrosion-through-dezincification test, a contamination test, a cutting test, a soundness test, a wear test and a hardness test. The test results are shown in Table 3 below.

cylindrical and/or densely cylindrical form were discharged on cutting as shown in FIG. 1, the machinability was assessed as "Bad" ("B" in Table 3). On the other hand, when spiral or convergently spiral, broken and shear-failed chips

TABLE 3

| No. | (1) Sound-ness | (2) Corrosion-through-dezinci-fication Test | (3) Contamination Test | | (4) Cutting Test | (5) Wear Test | | Tensil Test | | Hard-ness Test | Overall Evaluation of (1), (2), (3), (4) and (5) |
|---|---|---|---|---|---|---|---|---|---|---|---|
| | | | Pb | Sb | | Wear Resistance | Antii-Seizing Property | Tensile Str. kgf/mm² | Elongation % | HB | |
| Inventive Test Pieces: | | | | | | | | | | | |
| A | G | G | G | | G | G | E | 31 | 37 | 62 | G |
| B | | | | | | G | E | 30 | 32 | 68 | |
| C | | | | | | G | G | 29 | 40 | 68 | |
| D | | | | | | E | G | 33 | 30 | 68 | |
| E | | | | | | G | G | 27 | 35 | 62 | |
| F | | | | | | E | E | 28 | 38 | 62 | |
| Comparative Test Pieces: | | | | | | | | | | | |
| 8 | M | G | G | G | B | G | G | 33 | 20 | 68 | B |
| 9 | G | G | B | G | G | G | E | 30 | 15 | 60 | B |
| 10 | M | G | G | G | B | E | G | 35 | 18 | 85 | B |
| 11 | G | B | B | G | G | E | G | 42 | 43 | 110 | B |
| 12 | G | G | G | G | B | G | B | 41 | 32 | 120 | B |
| 13 | B | G | G | G | G | G | E | 32 | 20 | 51 | B |
| 14 | G | G | B | G | G | E | E | 35 | 16 | 95 | B |
| 15 | G | B*1 | G | G | B | E | B | 65 | 18 | 165 | B |
| 16 | G | G | B | G | G | B | G | 37 | 35 | 116 | B |

*1: The corrosion through dezincification took place.

The tensile test was conducted such that each test piece was machined to provide a JIS.B.2201.4 test piece (attached with a hard piece) and subjected to the test.

The corrosion-through-dezincification test was evaluated such that a test piece was machined into a disk having a diameter of 20 mm and a thickness of 10 mm, followed by testing according to "A corrosion-through-dezincification testing method (JBMA-T-303-1988) of The Technical Standards of the Japan Brass Makers Association to measure a depth of a dezincified layer. The depth of the dezincified layer which is not greater than 10 μm was evaluated as Good ("G" in Table 3), and the depth exceeding 10 μm was evaluated as Bad (("B") in Table 3).

The contamination test was effected in such a way that a test piece was machined into a bar having a diameter of 20 mm and a length of 150 mm and tested according to "the Regulations-Rules and Examination Standards of Tools Relating To Water Supplies (revised on July, 1983)" defined by Japan Water Works Association to determine the amounts of leached lead and antimony. As for lead, a measurement which was not greater than a contaminaton limit standard value of 0.02 mg/l was evaluated as acceptable ("G" in Table 3) and a measurement for antimony which was not greater than 0.002 mg/l was evaluated as acceptable. In contrast, measurements exceeding these values, respectively, were evaluated as unacceptable ("B" in Table 3).

Figure 2:
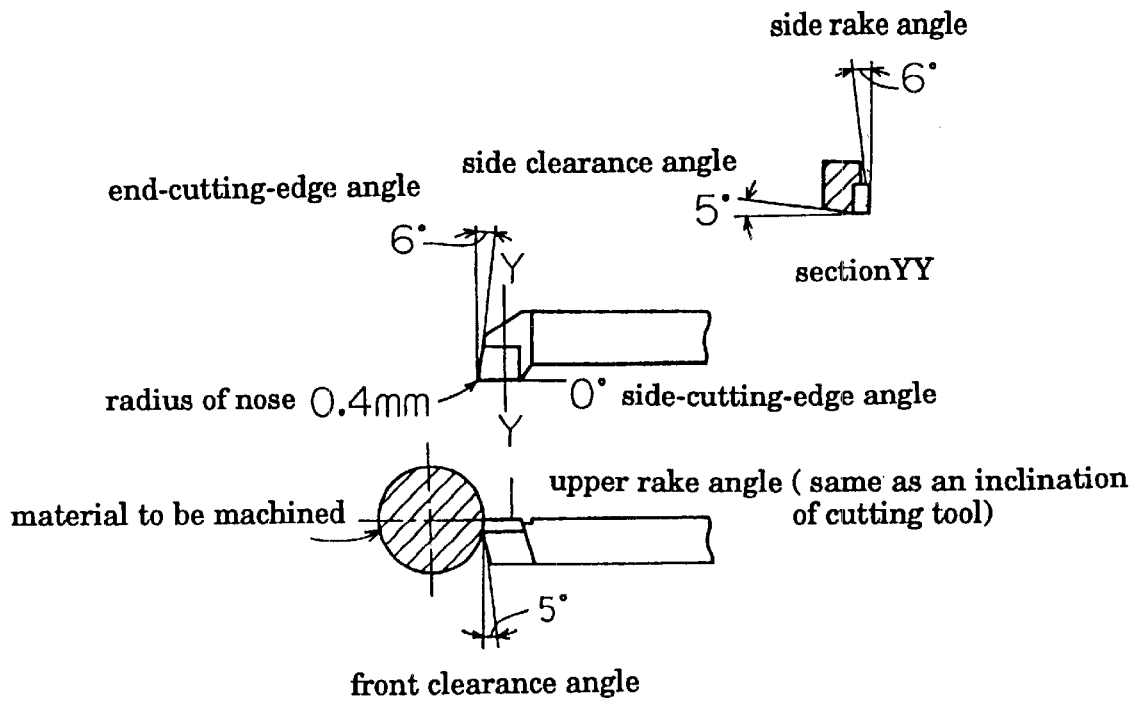
FIG. 2 is a schematic view showing the dimensions of the tools used to evaluate machinability.

The cutting test was conducted such that a test piece was machined into a bar having a diameter of 20 mm and a length of 150 mm and the outer surface was cut under conditions indicated in Table 4. The evaluation of machinability was evaluated as follows: when chips of linear, tangled, helical were discharged, the machinability was assessed as "Good" ("G" in Table 3). It will be noted that a cutting tool used had a shape as shown in FIG. 2 and was employed as shown in the figure.

The soundness test was conducted using a test piece which was machined into a bar having a diameter of 20 mm and a length of 200 mm, followed by subjecting the outer surface of the bar to a liquid penetrant test according to JIS-Z-2343. Ten bars for each test sample were tested. If a defect pattern with a size of not smaller than 1 mm was recognized, such a test bar was determined as unacceptable. Among ten bars for each test sample, when 8 or more bars were determined as acceptable, whereupon such a test sample was assessed as Good ("G" in Table 3). When 6 to 7 bars were acceptable, such a test sample was assessed as Moderate ("M" in Table 3). Moreover, when only not greater than 5 bars were acceptable, the test sample was assessed as Bad ("B" in Table 3).

Figure 3:
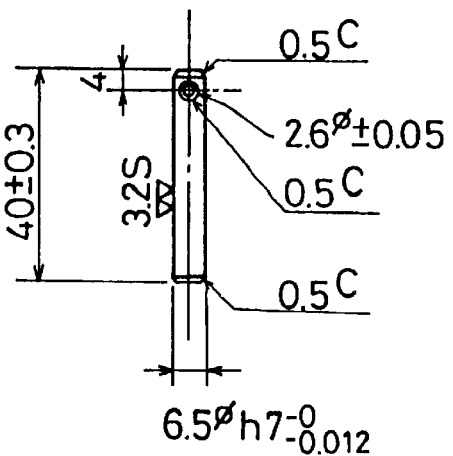
FIG. 3 is a schematic view showing the dimension of a test piece for a wear test.
Figure 4:
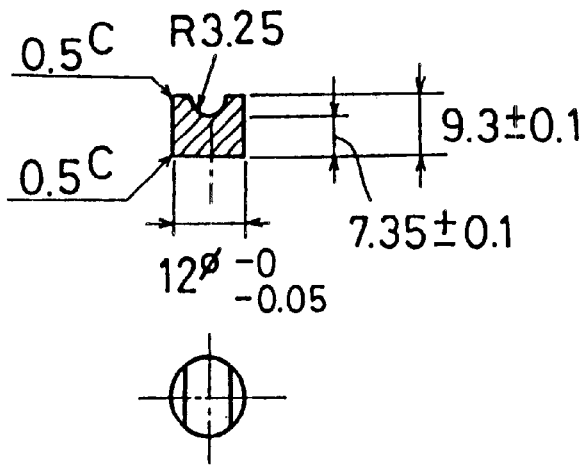
FIG. 4 is a schematic view showing the dimension of a U block used for the Faville wear test.
Figure 5:
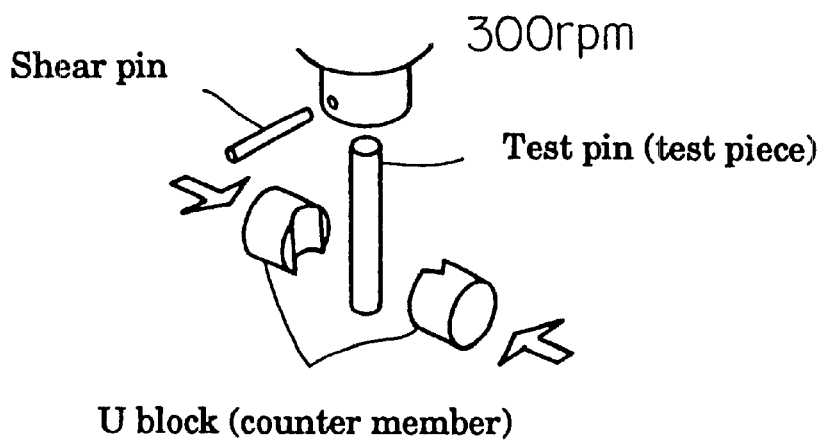
FIG. 5 is a schematic view showing the principle of the Faville wear test.

The wear test was conducted such that a test sample was machined into a test piece of a cylindrical form having a through-hole as shown in FIG. 3. U-shaped blocks shown in FIG. 4 were provided as a counter member for the test piece, followed by the Faville wear test in a manner as shown in FIG. 5 under conditions indicated in Table 5. The wear resistance and anti-seizing property were assessed from the abrasive wear and Faville values based on the standards shown in Table 6.

The wear resistance evaluation test was conducted in such a way that the test piece was tested for 10 minutes under a load of 300 kgf and the weights of the sample prior to and after the test to determine an abrasive wear (by volume: mm³) from the density thereof. A smaller abrasive wear was evaluated as better, and the evaluation was made by three ranks ("E" for Excellent, "G" for Good and "B" for Bad). The anti-seizing property test was started from an initial load of 200 kgf until seizing took place while increasing the load at a rate of 38 kgf/second, during which a torque and a load were, respectively, recorded. The Faville value, F, (Kgf·m) was calculated according to the following equation $$F=\int_0^{t1} P(t)dt$$

wherein P represents a load (Kgf), T represents a torque (Kgf–cm), t represents a time (seconds), and t1 represents a time before seizing. A greater Faville value leads to a better anti-seizing property. This property is evaluated by the following three standards: "E" for Excellent, "G" for Good, and "B" for Bad. The overall evaluation was made by the two ranks of Good ("G" in Table 3) and Bad ("B" in Table 3).

TABLE 4

| Characteristics | Cutting Conditions |
| --- | --- |
| Number of Revolutions | 4000 R.P.M. |
| Feed | 0.25 mm/revolution |
| Depth of Cut | 2 mm |
| Shape of Tool | shown in FIG. 2 |
| Material for Tool | K10 (super hard) |

TABLE 5

| | |
| --- | --- |
| Number of Revolutions | 300 R.P.M. |
| Sliding Speed | 0.102 m/second |
| Size of Test Piece | φ6.5 × 40 |
| Lubricating Oil | turbine oil #32 |
| Material of Counter Member | SCM 415 (HCQT) HRC = 60 |
| Surface Roughness | Test piece- 2 to 3 S, Counter Member - 2 to 3 S |

TABLE 6

| Abrasive Wear (mm$^3$) | Wear Resistance | Faville Value (Kgf · second) | Anti-seizing Property |
| --- | --- | --- | --- |
| less than 2 | E | 40,000 or over | E |
| from 2 to less than 8 | G | from 10,000 to less than 40,000 | G |
| 8 or over | B | less than 10,000 | B |

As will be apparent from the results of Table 3, the test samples of the examples of the invention are, as a whole, better than those for comparison. In addition, the alloys of the invention are substantially free of any injury from lead. Especially, the alloys of the invention exhibit very good machinability, anti-seizing property and pressure resistance and are satisfactory with respect to other characteristics such as castability, soundness, resistance to corrosion through dezincification, and wear resistance.

What is claimed is:

1. In a plumbing component used in contact with water, the improvement comprising said component comprising a cutting free bronze consisting of 3 to 8 wt. % Sn, 6 to 10 wt. % Zn, 0.5 to 6 wt. % Bi, 0.05 to 2 wt. % Sb, 0.001 to 0.5 wt. % P, less than 0.2 wt. % Pb, and the balance Cu.

2. In a plumbing component used in contact with water, the improvement comprising said component comprising a cutting free bronze consisting of 3 to 8 wt. % Sn, 6 to 10 wt. % Zn, 0.5 to 6 wt. % Bi, 0.05 to 2 wt. % Sb, 0.001 to 0.5 wt. % P, less than 0.2 wt. % Pb, 0.1 to 3 wt. % Ni, and the balance Cu.

* * * * *